(12) United States Patent
Halbweiss et al.

(10) Patent No.: US 6,364,395 B1
(45) Date of Patent: Apr. 2, 2002

(54) ADJUSTABLE FOLDING TOP FOR A MOTOR VEHICLE

(75) Inventors: Thomas Halbweiss, Marbach; Wojciech Wezyk, Sindelfingen; Berthold Klein, Rutesheim, all of (DE); Frank Neubrand, West Bloomfield, MI (US)

(73) Assignee: CTS Fahrzeug Dachsysteme GmbH, Korntal-Münchingen (DE)

( * ) Notice: Subject to any disclaimer, the term of this patent is extended or adjusted under 35 U.S.C. 154(b) by 0 days.

(21) Appl. No.: 09/609,766

(22) Filed: Nov. 3, 2000

(30) Foreign Application Priority Data

Jul. 3, 1999 (DE) .......................................... 199 30 774

(51) Int. Cl.⁷ .............................. B60J 7/00; B60J 7/08; B60J 7/12
(52) U.S. Cl. ................... 296/107.09; 296/118; 296/116; 296/107.16
(58) Field of Search ........................... 296/107.09, 118, 296/116, 107.16

(56) References Cited

U.S. PATENT DOCUMENTS 5,002,330 A * 3/1991 Koppenstein et al. ....... 296/116
6,270,143 B1 * 8/2001 Heselhaus et al. ..... 296/107.09

FOREIGN PATENT DOCUMENTS

| DE | 333770 | * 3/1921 | ................. 296/116 |
| DE | 943 747 | 6/1956 | |
| DE | 35 45 973 | 8/1986 | |
| DE | 37 24 532 C1 | 7/1987 | |
| DE | 38 18 616 C1 | 6/1988 | |
| DE | 38 37 522 A1 | 11/1988 | |
| DE | 43 27 729 C2 | 8/1993 | |
| DE | 44 23 834 C1 | 7/1994 | |
| DE | 196 18 296 C1 | 5/1996 | |
| EP | 0 760 301 A1 | 6/1996 | |

* cited by examiner

*Primary Examiner*—Stephen T. Gordon
*Assistant Examiner*—Hilary Gutman
(74) *Attorney, Agent, or Firm*—Crowell & Moring LLP

(57) ABSTRACT

An adjustable folding top for a motor vehicle can be adjusted between a closed position covering the vehicle interior and a deposited position. The top is equipped with a folding top linkage having a plurality of movably arranged transverse and side bows. In order to provide a simply constructed and space-saving folding top, a rearward transverse bow of the folding top linkage, which faces the depositing space of the folding top, has a multipart construction with at least one center section and two lateral sections. The lateral sections are connected with the center section by way of articulations. Furthermore, during the transition from the closed position into the deposited position, the rearward transverse bow can be displaced along the longitudinal axis of the vehicle in the direction of the rearward side of the vehicle and, during the transition from the closed position into the deposited position, the lateral sections of the rearward transverse bow can be swivelled in the direction of the vehicle interior.

13 Claims, 3 Drawing Sheets

ADJUSTABLE FOLDING TOP FOR A MOTOR VEHICLE

BACKGROUND OF THE INVENTION

The present invention relates to an adjustable folding top for a motor vehicle which top is adjustable between a closed position covering a vehicle interior and a deposited position. More specifically, a folding top linkage with a plurality of movably arranged transverse and side bows is provided, of which a rearward transverse bow of the side bows facing a depositing space of the folding top has a multi-part construction consisting of at least one center section and two side sections operatively connected with the center section by articulations. Thereby during a transition from the closed position to the deposited position, the lateral sections of the rearward transverse bow are swivellable in a direction of the vehicle interior.

DE-PS 943 747 discloses a motor vehicle folding top which has a folding top linkage and a folding top covering and can be adjusted between a closed position closing off the vehicle interior and a deposited position. The folding top linkage and the folding top covering are stored in a depositing space behind the vehicle seats. The folding top linkage consists of a plurality of transverse bows and side bows which are connected in an articulated manner with the vehicle body. The transverse bows and side bows are kinematically coupled so that, by way of the drive of a bow, all other linkage parts are adjusted in a restrictedly guided manner between the closed and the deposited position.

Another adjustable folding top described in DE 43 27 729 C2 shows a folding top having an adjustable folding top linkage and a folding top covering mounted on the folding top linkage. The folding top linkage and the folding top covering can, in turn, be adjusted between a closed and a deposited position. A rear window is integrated in the folding top covering, which rear window, during the change into the deposited position, can be lowered into the depositing space situated behind the seats.

Folding tops of this type have the problem that, for the change into the deposited position, the rear window has to describe a relatively large curve in order to avoid a collision with the headrests or the rollover bar. Simultaneously, the depositing space, which also accommodates the folding top and directly adjoins the vehicle interior, for reasons of space, has to be as small as possible.

DE 196 18 296 C1 discloses a folding top for a motor vehicle which can be adjusted between a closed position and a deposited position and has diverse cross and side bows assigned to the folding top linkage. A rearward fabric-holding bow is swivellably held on a swivel bearing and, for the change from the closed into the deposited position, is foldable from a horizontal position into a vertical position in order to provide space for the opening movement of a folding top compartment lid closing off a depositing space. After the folding top compartment lid has been opened, the rearward fabric-holding bow, together with the additional linkage parts of the folding top linkage, can be lowered into the depositing space by being rotated about the swivel bearing.

The rearward fabric-holding bow is constructed in three parts, comprising a center section and two lateral sections. During the transition from the closed position into the deposited position, the lateral sections swivel with respect to the center section in the direction of the vehicle interior in each case about an axis of rotation which crosses the longitudinal axis of the vehicle. The swivelling movement of the lateral sections with respect to the center section has the purpose of causing a small storage dimension of the folding top in the transverse direction of the vehicle. In DE 196 18 296 C1, the rearward fabric-holding bow can carry out only a swivelling movement about the main swivel bearings but no translational displacing movement. During the change into the deposited position, the lateral sections are swivelled essentially downward about a spatial axis of rotation, so that a swivelling movement occurs which, on the whole, is three-dimensional and which requires a comparatively large moving space.

DE 38 18 616 C1 shows a vehicle folding top whose rearward fabric-holding bow, during the change into the deposited position, can be swivelled as well as translationally displaced. The U-shaped fabric-holding bow is constructed in one piece and, because of its U-shape, carries out a spatial movement which equires a corresponding amount of space.

Comparable constructions are also disclosed in DE 37 24 532 C1 and DE 44 23 834 C1.

SUMMARY OF THE INVENTION

An object of the present invention is to provide an adjustable folding top for a motor vehicle which has a simple construction and can be folded together to a small size in the deposited position.

According to the invention, this object has been achieved by providing that, during the transition from the closed position into the deposited position, the rearward transverse bow can be displaced along the longitudinal axis of the vehicle in the direction of the rear of the vehicle translationally in a horizontal moving plane and the lateral sections can be swivelled in this moving plane.

More particularly, a rearward transverse bow is assigned to the folding top linkage. This transverse bow is expediently arranged directly adjacent to the depositing space and consists of a center section as well as two lateral sections which are swivellable in an articulated manner with respect to the center section. In addition, during the changing movement between the closed position and the deposited position, the rearward transverse bow can be translationally displaced toward the rear in the longitudinal direction of the vehicle and is kinematically restrictedly guided particularly by way of the adjusting movement of the folding top. As a result of the displacing movement toward the rear, sufficient space is available in order to be able to also deposit large rear windows in the horizontal position. Because the rearward bow is connected with the rear window, in particular, is coupled with the rear window by way of an articulation, a displacement of the rear transverse bow toward the rear necessarily also causes a corresponding translational displacing movement of the rear window.

By way of the translational displacing movement of the rearward transverse bow, the lateral sections, which are connected in an articulated manner with the center section of the transverse bow, are simultaneously swivelled in the direction of the vehicle interior. Thereby, particularly in the transverse direction of the vehicle tapering toward the rear, a space-saving arrangement of the transverse bow can be implemented in the deposited position. In addition, the swivelling movement of the lateral sections of the transverse bow results in the advantage that the position of the free face or end of each lateral section changes only slightly during the transition movement from the closed position into the deposited position. Consequently, a correspondingly small play occurs when the folding top fabric is tied on. As a result, the tightness of the folding top is increased.

When the folding top is closed, the movement of the rearward transverse bow takes place in the opposite direction. The transverse bow is translationally displaced toward the front, and there are no fluidic, spatial or optical impairments by a bow protruding toward the rear.

The rearward transverse bow can be displaced and swivelled in a horizontal moving plane so that the rearward transverse bow carries out no spatial but only a planar movement. The kinematic guiding of the transverse bow is correspondingly simplified.

The folding top linkage advantageously comprises another transverse bow which is disposed in front of the rearward transverse bow. The forward transverse bow is connected with the rearward transverse bow by way of a longitudinal hoop which causes a restricted kinematic guidance of the rearward transverse bow. In an advantageous embodiment, the forward transverse bow also is connected with the rear window in an articulated manner.

The folding top preferably has an upper roof part which expediently is to be operated by way of an assigned adjusting mechanism. The adjusting mechanism is advantageously constructed as a four-bar mechanism and has two lateral bows which are connected with the vehicle body in an articulated manner. The guiding of the upper roof part by way of the four-bar mechanism has the advantage that, during the transition into the deposited position, the upper roof part can be swivelled essentially horizontally over the headrests and can then be lowered.

One lateral bow of the four-bar mechanism is expediently connected in an articulated manner with the forward transverse bow which extends above the rear window. An adjusting movement of the four-bar mechanism is thus transmitted by way of the forward transverse bow and the longitudinal hoop to the rearward transverse bow. Preferably together with a supporting hoop, the transverse bow forms another four-bar mechanism which supports the lateral bow of the first mechanism acting upon the roof part.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

In the following embodiments, identical components have the same reference numbers.

Figure 1:
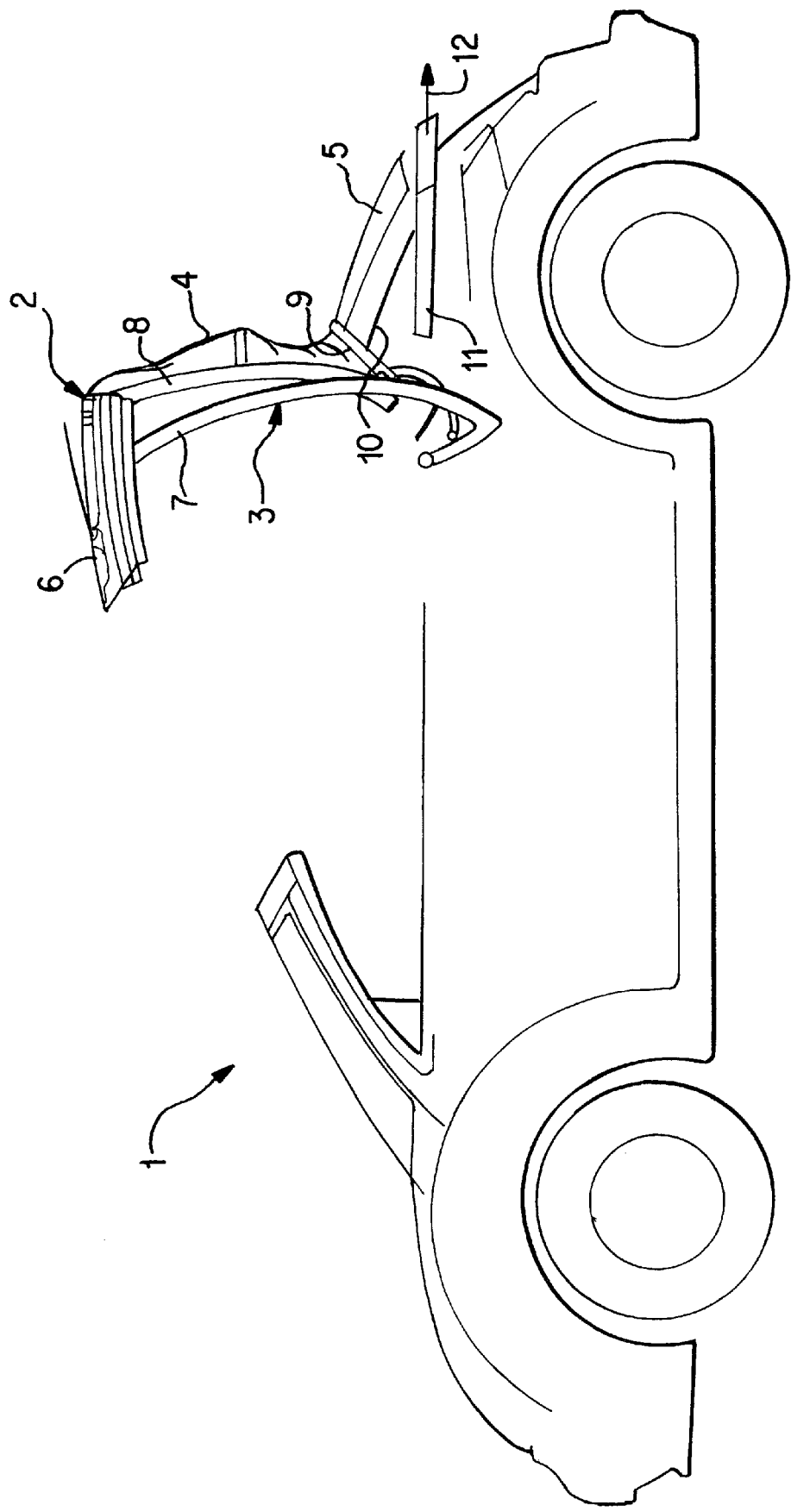
FIG. 1 is a side view of a motor vehicle with a partially opened folding top according to the present invention.

The folding top 2 of a motor vehicle 1 illustrated in FIG. 1 is constructed to be adjustable between a closed position, in which the vehicle interior is closed, and a deposited position, in which the folding top 2 is stored in a depositing space arranged behind the vehicle interior. The folding top 2 consists of a folding top linkage 3 having a plurality of side and transverse bows or hoops, a folding top covering 4, a rear window 5 as well as of an upper roof part 6 which is integrated into the folding top as a rigid component. The roof part 6 is held by a four-bar mechanism which is formed in part by the linkage 3 and comprises two side bows on each vehicle side, of which, in the side view of FIG. 1, the side bows 7 and 8 are illustrated which are arranged on one side. Furthermore, a transverse bar 9, which is disposed in a forward position in the longitudinal direction of the vehicle and extends along the width of the folding top, and a rearward transverse bar 11, which also extends along the width of the folding top, are assigned to the folding top linkage 3. Between the forward and the rearward transverse bow 9 and 11, a connecting hoop 10 is connected with the forward transverse bow 9 and transmits an adjusting movement of the transverse bow 9 to the rearward transverse bow 11. The rear window 5 is situated in the space between the transverse bow 9 and the transverse bow 11.

The rearward transverse bow 11 can be translationally displaced in the direction of the arrow 12. The direction of the arrow 12 extends parallel to the longitudinal axis of the vehicle. During the transition from the closed position into the deposited position, the rearward transverse bow 11 is translationally displaced toward the rear; a corresponding reverse adjusting movement takes place during the transition of the folding top from the deposited position into the closed position.

The rear window 5 mounted between the forward transverse bow 9 and the rearward transverse bow 11 is disposed in an articulated manner with respect to the two transverse bows 9 and 11. The folding top covering 4 extends from the upper roof part 6 to the rear window 5. In addition, the folding top covering 4 is also tied laterally to the rearward transverse bow 11.

Figure 2:
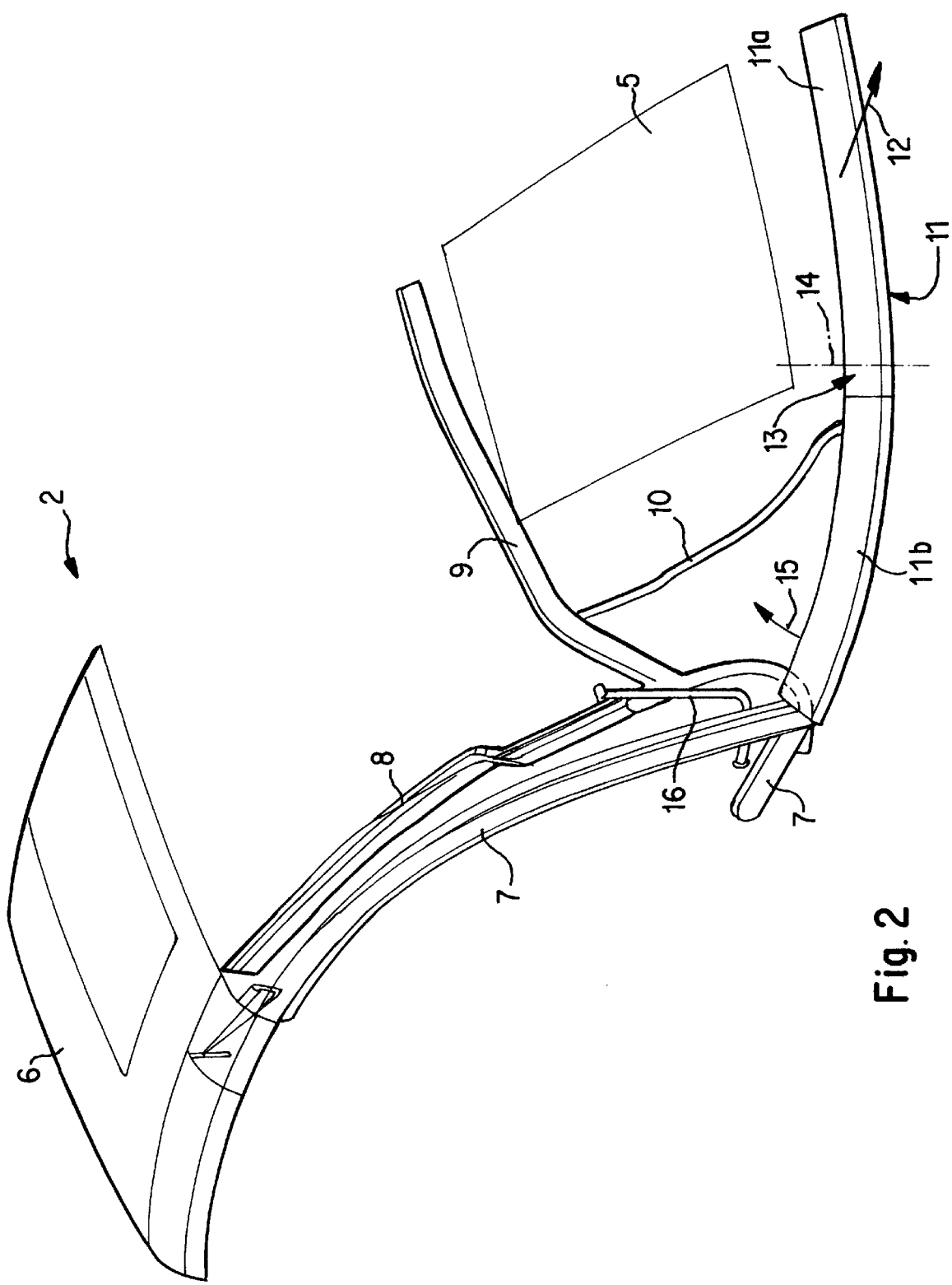
FIG. 2 is an enlarged view of the folding top shown in FIG. 1 but in the closed position.
Figure 3:
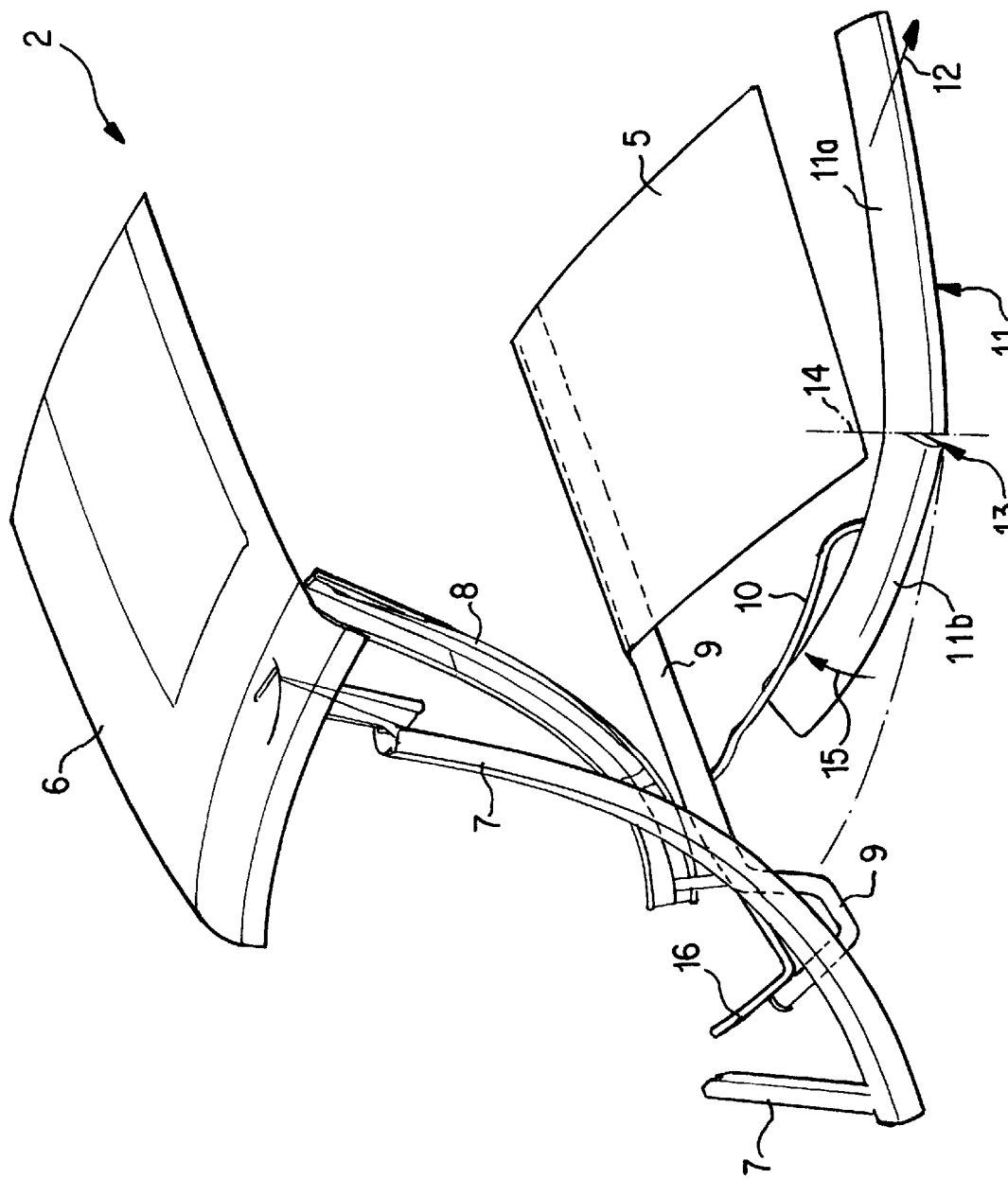
FIG. 3 is a view of the folding top shown in FIGS. 1 and 2 but during the transition from the closed into the deposited position.

In the perspective illustration according to FIG. 2, the folding top 2 is shown in the closed position, in which the vehicle interior is covered. Like FIG. 3, this representation shows only one side half of the folding top 2; the opposite half, which is not shown, is arranged mirror-symmetrically.

The rearward transverse bow 11 is constructed of three parts and consists of a center section 11a as well as two lateral sections, of which FIG. 2 shows only one lateral section 11b. The lateral section 11b is coupled by way of an articulation 13 with the center section 11a. The articulation 13 has an articulation axis 14 which extends perpendicularly and maintains the same direction in all positions of the folding top 2. The rearward transverse bow 11 moves in a horizontal moving plane in which a translational as well as a rotary movement of the transverse bow 11 takes place. During the transition from the closed into the deposited position, the transverse bow 11 is translationally displaced toward the rear in the direction of the arrow 12. Simultaneously, the lateral sections 11b are swivelled in the direction of the arrow 15 about the articulation axis 14 of the articulation 13 relative to the center section 11a toward the inside in the direction of the vehicle interior; see also FIG. 3. During the transition movement, the rearward transverse bow 11 is acted upon by the connecting hoop 10 which is connected with the forward transverse bow 9. An adjusting movement of the transverse bow 9 is transmitted by way of the connecting hoop 10 to the rearward transverse bow 11. The connecting hoop 10 is applied to the rearward transverse bow 11 in the area of the lateral section 11b.

The swivelling movement about the articulation axis 14 of the articulation 13 has the result that the translational movement of the free face or end of the lateral section 11b, which is caused by the translational displacement in the direction of the arrow 12, is partially compensated by the rotatory movement, so that, during the transition between the closed and the deposited position, the positions of the free faces or ends of the lateral sections 11b remain relatively stationary. This reduces the area of the fabric play and increases the tightness of the folding top.

The upper roof part 6 is connected with the vehicle body by way of an articulation mechanism. The articulation mechanism comprises the side bows 7 and 8. The forward side bow 7 is connected with the vehicle body and with the roof part 6 in an articulated manner. The second rearward side bow 8 is disposed in an articulated manner on the roof part 6. On the opposite end, the second side bow 8 is connected in an articulated manner with the forward transverse bow 9 as well as with another supporting hoop 16. The supporting hoop 16 is applied directly above the connection between the forward transverse bow 9 and the side bow 8 to the latter. The supporting hoop 16 as well as the forward transverse bow 9 are connected by way of additional articulations with the vehicle body. The articulation, by way of which the supporting hoop 16 is connected with the vehicle body, is situated between the vehicle interior and that articulation which connects the forward side bow 7 with the vehicle body.

In the described embodiment, the upper roof part 6 is connected with the vehicle body by way of a multi-articulation mechanism, which comprises a total of seven articulations. The articulations are situated between the vehicle body and the side bow 7, between the side bow 7 and the roof part 6, between the roof part 6 and the side bow 8, between the side bow 8 and the supporting hoop 16, between the side bow 8 and the forward transverse bow 9, between the supporting hoop 16 and the vehicle body as well as between the forward transverse bow 9 and the vehicle body.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Adjustable folding top for a motor vehicle, said top being adjustable between a closed position covering a vehicle interior and a deposited position, comprising a folding top linkage with a plurality of movably arranged transverse and side bows, of which a rearward transverse bow of the side bows facing a depositing space of the folding top has a multi-part construction consisting of at least one center section and two side sections operatively connected with the center section by articulations such that, during a transition from the closed position to the deposited position, the side sections of the rearward transverse bow are swivellable in a direction of the vehicle interior and the rearward transverse bow is displaceable along a longitudinal axis of the vehicle toward a rear of the vehicle translationally in a horizontal moving plane, with the lateral sections being swivellable in the moving plane.

2. Folding top according to claim 1, wherein the folding top has a movably fastened rear window connectable with the rearward transverse bow.

3. Folding top according to claim 2, wherein the rear window is operatively articulatably connected with the rearward transverse bow.

4. Folding top according to claim 1, wherein a forward transverse bow is arranged in front of the rearward transverse bow and is articulatably held on the vehicle body, the forward transverse bow and the rearward transverse bow being operatively connected by a connecting hoop.

5. Folding top according to claim 4, wherein the folding top has a movably fastened rear window connectable with the rearward transverse bow.

6. Folding top according to claim 5, wherein the rear window is operatively articulatably connected with the rearward transverse bow.

7. Folding top according to claim 4, wherein ends of the rearward transverse bow and of the forward transverse bow are directly adjacent to one another at least in the closed position.

8. Folding top according to claim 7, wherein the folding top has a movably fastened rear window connectable with the rearward transverse bow.

9. Folding top according to claim 8, wherein the rear window is operatively articulatably connected with the rearward transverse bow.

10. Folding top according to claim 1, where the folding top has an upper roof part arranged to be adjusted between the closed and the deposited position by a mechanism.

11. Fold top according to claim 10, wherein a forward transverse bow is arranged in front of the rearward transverse bow and is articulatably held on the vehicle body, the forward transverse bow and the rearward transverse bow being operatively connected by a connecting hoop.

12. Folding top according to claim 11, wherein the mechanism is operatively connected with the forward transverse bow.

13. Folding top according to claim 11, wherein the mechanism is a four-bar mechanism with two side bows articulatably connected with the vehicle body, and one of said side bows of the four-bar mechanism is connected with the forward transverse bow.

* * * * *